US008548328B2

(12) United States Patent  (10) Patent No.: US 8,548,328 B2
Hood  (45) Date of Patent: Oct. 1, 2013

(54) TRANSPARENT OVERHEAD IN A PASSIVE OPTICAL NETWORK THAT SUPPORTS ENHANCED FEATURES

(75) Inventor: David Hood, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 233 days.

(21) Appl. No.: 13/236,360

(22) Filed: Sep. 19, 2011

(65) Prior Publication Data

US 2013/0064539 A1   Mar. 14, 2013

Related U.S. Application Data

(60) Provisional application No. 61/532,466, filed on Sep. 8, 2011.

(51) Int. Cl.
*H04J 14/00*  (2006.01)
*H04Q 11/00*  (2006.01)

(52) U.S. Cl.
CPC .................................. *H04Q 11/0067* (2013.01)
USPC .............................................. 398/67; 398/72

(58) Field of Classification Search
USPC .................................... 398/58, 66–68, 70–72
See application file for complete search history.

(56) References Cited

U.S. PATENT DOCUMENTS

| 8,462,656 | B2 * | 6/2013 | Zhou et al. ..................... 370/252 |
| 2004/0218534 | A1 * | 11/2004 | Song et al. ................. 370/236.2 |
| 2009/0226182 | A1 * | 9/2009 | Adamiecki et al. ........... 398/140 |
| 2010/0183030 | A1 * | 7/2010 | Lou et al. ....................... 370/474 |

FOREIGN PATENT DOCUMENTS

EP   2296336   8/2009

OTHER PUBLICATIONS

10-Gigabit-capable passive optical networks (XG-PON): Transmission convergence (TC) specifications; International Telecommunication Union, Oct. 2010, pp. 1-63.
Gigabit-capable Passive Optical Networks (G-PON): Transmission convergence layer specification; Telecommunication Standardization Sector of ITU; Mar. 2008; pp. 30-48.

* cited by examiner

*Primary Examiner* — Dalzid Singh
(74) *Attorney, Agent, or Firm* — Blakely, Sokoloff, Taylor & Zafman

(57) ABSTRACT

A Gigabit-capable Passive Optical Network (GPON), including an enhanced Optical Line Termination (OLT) and Optical Network Units (ONUs), provides enhanced features, e.g., features defined in XG-PON. One or more of the ONUs are enhanced ONUs. The enhanced OLT communicates with the ONUs via downstream frames and upstream bursts, each downstream frame and upstream burst being compliant with a GPON framing format. The enhanced OLT transmits downstream frames to the ONUs, the downstream frames including downstream sub-frames with at least one downstream sub-frame being an overhead sub-frame that includes information of the enhanced features. The enhanced OLT receives upstream bursts from the ONUs, the upstream bursts including upstream sub-frames, each upstream sub-frame including an upstream identifier field that indicates to the enhanced OLT whether the upstream sub-frame is an overhead sub-frame. The enhanced OLT and the enhanced ONUs perform network operations to provide the enhanced features specified in the overhead sub-frame.

22 Claims, 5 Drawing Sheets

FIG. 5A UPSTREAM BURST 500

TRANSPARENT OVERHEAD IN A PASSIVE OPTICAL NETWORK THAT SUPPORTS ENHANCED FEATURES

CROSS-REFERENCE TO RELATED APPLICATIONS

The present application claims priority from U.S. Provisional Patent Application No. 61/532,466, filed on Sep. 8, 2011.

FIELD

Embodiments of the invention relate to a passive optical network (PON). More specifically, embodiments of the invention relate to the use of a transparent overhead in a PON that supports enhanced features.

BACKGROUND

Passive optical networks (PONs) are a popular architecture for economically delivering telecommunications services to individual subscribers or groups of subscribers. Current PON deployments are typically based on IEEE 802.3ah (Ethernet PON (EPON)) or ITU-T G.984 (Gigabit-capable PON (GPON)). Both of these existing technologies have evolved into a next generation of networks, which is currently in early trial deployment. For example, IEEE has standardized 10GE-PON in 802.3av, while ITU-T has standardized XG-PON in the G.987 series of recommendations.

In both cases, the existing technologies have been extended in the next-generation standards to satisfy increased demand on service features and to take advantage of recent technological improvements. Developers of the next-generation standards propose replacement of existing infrastructure with next-generation equipment. As such, there has been no plan to retrofit next-generation features and benefits onto the current-generation products.

However, the current generation products are expected to have a long product life. To exploit the benefits available from some of the next-generation enhancements, it is valuable that existing devices (also referred to as "legacy devices") be able to support at least some of the enhanced features of the next-generation equipment. Although this is desirable, it would be unacceptable to implement such feature support by completely re-defining upstream or downstream signals, because a legacy device would be unable to decode such signals.

SUMMARY

A method for providing enhanced features in a Gigabit-capable Passive Optical Network (GPON) is disclosed. According to embodiments of the invention, a GPON, including an enhanced Optical Line Termination (OLT) and Optical Network Units (ONUs), provides enhanced features. The ONUs further include enhanced ONUs and legacy ONUs. The enhanced OLT communicates with the ONUs via downstream frames and upstream bursts, each downstream frame and upstream burst being compliant with a GPON framing format. The enhanced OLT transmits downstream frames to the ONUs, the downstream frames including downstream sub-frames with at least one downstream sub-frame being an overhead sub-frame that includes information of the enhanced features. Each downstream sub-frame includes a downstream identifier field that indicates to the plurality of ONUs whether the downstream sub-frame is an overhead sub-frame, and the overhead sub-frame is recognizable by the enhanced ONUs and transparent to the legacy ONUs. The enhanced OLT receives upstream bursts from the ONUs, the upstream bursts including upstream sub-frames, each of the upstream sub-frames including an upstream identifier field that indicates to the enhanced OLT whether the upstream sub-frame is an overhead sub-frame. The enhanced OLT and the enhanced ONUs perform network operations to provide the enhanced features specified in the overhead sub-frame.

A network element functioning as an enhanced OLT is described. According to embodiments of the invention, the enhanced OLT implements enhanced features in a GPON that comprises the enhanced OLT and ONUs. The ONUs further include enhanced ONUs and legacy ONUs. The enhanced OLT communicates with the ONUs via downstream frames and upstream bursts, each downstream frame and upstream burst being compliant with a GPON framing format, the network element includes a transmitter to transmit the downstream frames to the ONUs, the downstream frames including downstream sub-frames with at least one downstream sub-frame being an overhead sub-frame that includes information of the enhanced features. Each of the downstream sub-frames includes a downstream identifier field that indicates to the plurality of ONUs whether the downstream sub-frame is the overhead sub-frame, and the overhead sub-frame is recognizable by the enhanced ONUs and transparent to the legacy ONUs. The network element also includes a receiver to receive the upstream bursts from the ONUs, the upstream bursts including upstream sub-frames, each of the upstream sub-frames including an upstream identifier field that indicates to the enhanced OLT whether the upstream sub-frame is the overhead sub-frame. The network element further includes a processor coupled to the transmitter and the receiver to perform network operations to thereby provide the enhanced features specified in the overhead sub-frame.

A network element functioning as an enhanced ONU is described. According to embodiments of the invention, the enhanced ONU implements enhanced features in a GPON that comprises an enhanced OLT and ONUs. The ONUs further include the enhanced ONU and legacy ONUs. The enhanced OLT communicates with the ONUs via downstream frames and upstream bursts, each downstream frame and upstream burst being compliant with a UPON framing format. The network element includes a receiver to receive the downstream frames from the enhanced OLT, the downstream frames including downstream sub-frames with at least one of the downstream sub-frames being an overhead sub-frame that includes information of the enhanced features. Each downstream sub-frame includes a downstream identifier field that indicates to the plurality of ONUs whether the downstream sub-frame is the overhead sub-frame, and the overhead sub-frame is recognizable by the enhanced ONUs and transparent to the legacy ONUs. The network element also includes a transmitter to transmit the upstream bursts to the enhanced OLT, the upstream bursts including upstream sub-frames, each of the upstream sub-frames including an upstream identifier field that indicates to the enhanced OLT whether the upstream sub-frame is the overhead sub-frame. The network element further includes a processor coupled to the transmitter and the receiver to perform network operations to thereby provide the enhanced features specified in the overhead sub-frame.

BRIEF DESCRIPTION OF THE DRAWINGS

The present invention is illustrated by way of example, and not by way of limitation, in the figures of the accompanying drawings in which like references indicate similar elements.

It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 5A and 5B are diagrams illustrating an example of a framing format for an upstream burst.

DESCRIPTION OF EMBODIMENTS

Figure 1:
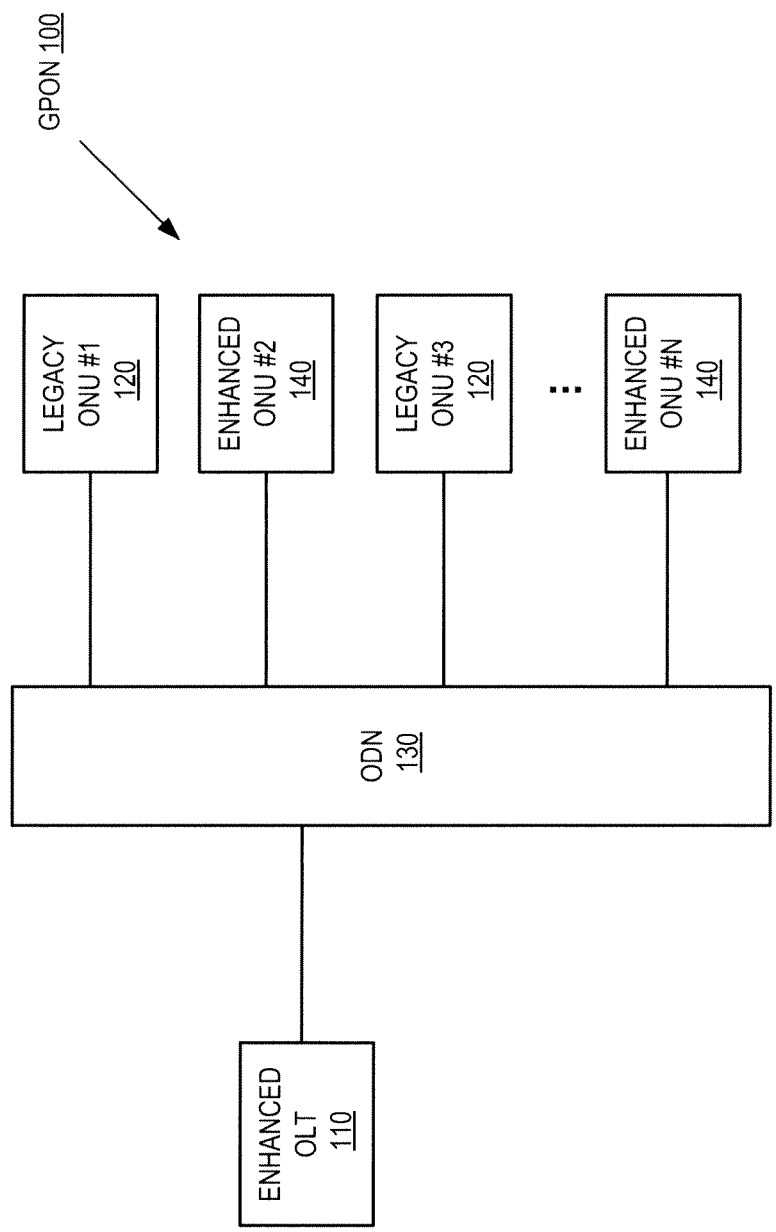
FIG. 1 is a diagram of one embodiment of a GPON supporting enhanced features.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention use an additional overhead to transfer information of enhanced features in a transparent fashion by concealing the information in a packet (e.g., a frame or a burst) that appears to be ordinary payload to legacy devices. Existing standards (e.g., ITU-T G.984) specify that the payload be encapsulated in a wrapper that is distinct from the physical layer overhead structure. In G.984.3, the wrapper is called a GPON encapsulation method (GEM) frame. Part of the GEM frame includes a GEM port ID, which is an identifier that uniquely defines a flow on the GPON. In existing art, the GEM port ID is defined as part of service provisioning; an additional GEM port is defined for use by a high-level management channel. A receiving device examines the GEM port ID on each received GEM frame, and discards any GEM frames whose GEM port it does not recognize.

According to embodiments of the invention, the additional overhead (also referred to as an "overhead sub-frame") is a GEM frame (also referred to as an "overhead GEM frame"). In one embodiment, an enhanced device encapsulates the additional overhead into a GEM frame, which has the same framing format as in a legacy GPON but whose port ID is not recognized by legacy devices. The legacy devices thereby ignore the additional overhead. On the other hand, an enhanced device recognizes the GEM port ID and accepts the additional overhead. An enhanced device can use the additional overhead to support enhanced features, which are the features not available in a legacy GPON.

In the following description, the features of G.984 are referred to as legacy features, supported by legacy OLTs and legacy ONUs. Features that are enhancements to the legacy features are referred to as enhanced features. Devices supporting the enhanced features are referred to as enhanced OLTs or enhanced ONUs.

In some embodiments, the GEM port ID for enhanced service can be either provisioned, or can be a well-known value (i.e., a designated value known to the enhanced devices) that is not otherwise used for existing services. In one embodiment, the overhead GEM frame is transmitted once per downstream frame, and/or once per upstream burst, as the first GEM frame after the frame/burst header. In one embodiment, a frame or burst may contain more than one overhead GEM frame, or a given frame or burst may contain no overhead GEM frame. In one embodiment, the overhead GEM frame may be carried in a different or arbitrary location in the frame/burst. The overhead GEM frame can be of a fixed or variable length, according to the set of enhanced features selected to be carried therein.

In one embodiment, the enhanced features described herein can be provided by software, firmware, hardware, or a combination of the above. The primary benefits available to the GPON from the feature enhancement include but are not limited to: faster PON initialization through more flexible physical-layer operations, administrations and maintenance (PLOAM) rules; power-saving features (e.g., doze and/or sleep mode); minimization of reporting delay to network operators (e.g., inclusion of a dying gasp indication as a bit in the upstream burst overhead). In one embodiment, the enhanced features can include one or more of the features defined in an XG-PON according to ITU-T G.987.3. Additional enhanced features can also be included. The enhanced features can include but are not limited to: transmission of multiple PLOAM messages per downstream frame/upstream burst, transmission of a PLOAM message without repetitions, sleep and doze modes, performance monitoring and alarms, longer framing patterns than the framing patterns defined in a legacy GPON that does not support the enhanced features. The enhanced features can also include low-layer management of encryption control in both upstream and downstream directions, multicast encryption control, ONU authentication and key update. The enhanced encryption control offer a network the capabilities beyond those of a legacy GPON, such as how and/or whether GEM frames carrying subscriber data (not the overhead) are encrypted in the upstream direction. Each of these enhanced features is described in detailed later.

FIG. 1 is a diagram of one embodiment of a GPON 100 that supports enhanced features. The GPON 100 includes an enhanced OLT 110, which is coupled to a set of legacy ONUs 120 and enhanced ONUs 140 via an optical distribution network (ODN) 130. The legacy ONUs 120 and enhanced ONUs 140 are also collectively referred to as ONUs 120 and 140. The enhanced OLT 110 can be operated by or belong to a network service provider. The ONUs 120 and 140 are devices that terminate the UPON 100 and present telecommunications service interfaces to subscribers.

In the descriptions herein, the term "downstream" refers to the direction of transmission from the enhanced OLT 110 to the ONUs 120 and 140, and the term "upstream" refers to the direction of transmission from the ONUs 120 and 140 to the enhanced OLT 110. The term "legacy device" refers to the device that does not support enhanced features; e.g., a legacy OLT or a legacy ONU that is in compliance with a current-generation standard, such as ITU-T G.984. The term "enhanced device" refers to the device that supports enhanced features; e.g., an enhanced OLT or an enhanced ONU.

Figure 2:
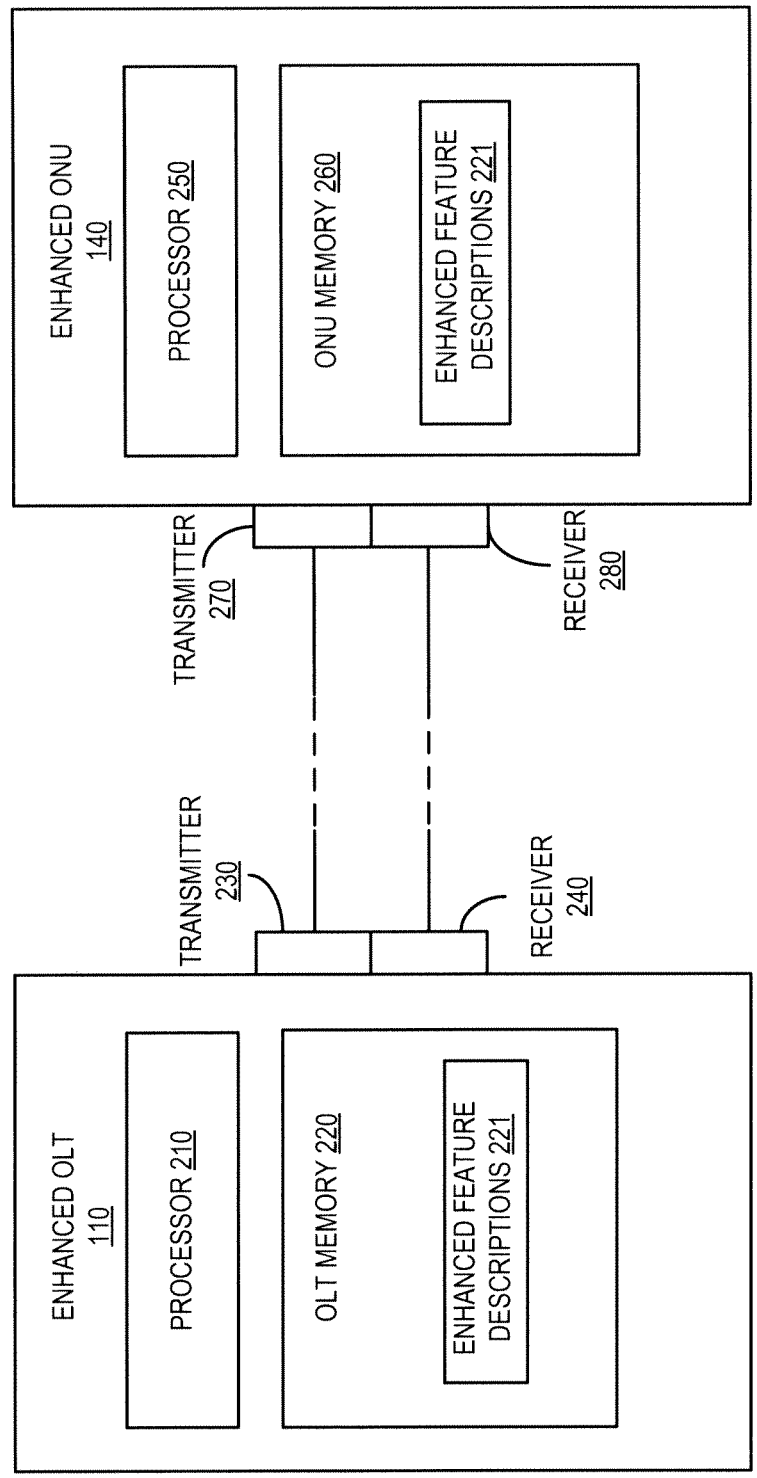
FIG. 2 is a diagram of one embodiment of an enhanced OLT and an enhanced ONU.

FIG. 2 illustrates one embodiment of the enhanced OLT 110 and the enhanced ONU 140. The structure of the legacy ONU 120 is known in the art and is not described herein. In one embodiment, the enhanced OLT 110 includes a transmitter 230 and a receiver 240. The OLT transmitter 230 transmits downstream signals on channels allocated to the ONUs 120 and 140. The receiver 240 receives upstream signals from the ONUs 120 and 140. The enhanced OLT 110 also includes a processor 210 and an OLT memory 220. The processor 210 performs operations to provide services to the ONUs 120 and 140; in particular, services with enhanced features to the enhanced ONUs 140. The OLT memory 220 stores, among other data, enhanced feature descriptions 221. In one embodiment, the enhanced feature descriptions 221 describe the enhanced features that are currently available for use by the enhanced OLT 110.

In one embodiment, the enhanced ONU 140 includes a transmitter 270 for transmitting upstream signals to the enhanced OLT 110 and a receiver 280 for receiving downstream signals from the enhanced OLT 110. The enhanced ONU 140 also includes a processor 250 and an ONU memory 260. The processor 250 performs operations to support services with enhanced features. The ONU memory 260 also stores the enhanced feature descriptions 221, which describe the enhanced features that are currently available for use by the enhanced ONU 140.

Although not shown in the figures, it is understood that a GPON can include a legacy OLT coupled to one or more enhanced ONUs. As enhanced features need to be supported by a connection with enhanced devices at both ends, the legacy OLT will not be able to support enhanced features when communicating with enhanced ONUs. Thus, a GPON does not presuppose that its ONU or OLT supports the enhanced features. In a GPON that contains one or more enhanced devices (e.g., enhanced ONU and/or enhanced OLT), the following conditions need to be satisfied:

Each device (ONU and OLT) is initialized in legacy mode.
Enhanced features may be invoked only after successfully negotiating that both OLT and ONU support the enhanced features.
An enhanced ONU may not transmit any enhanced features to a legacy OLT.
Enhanced features in the downstream direction are transparent to legacy ONUs.

Figure 3:
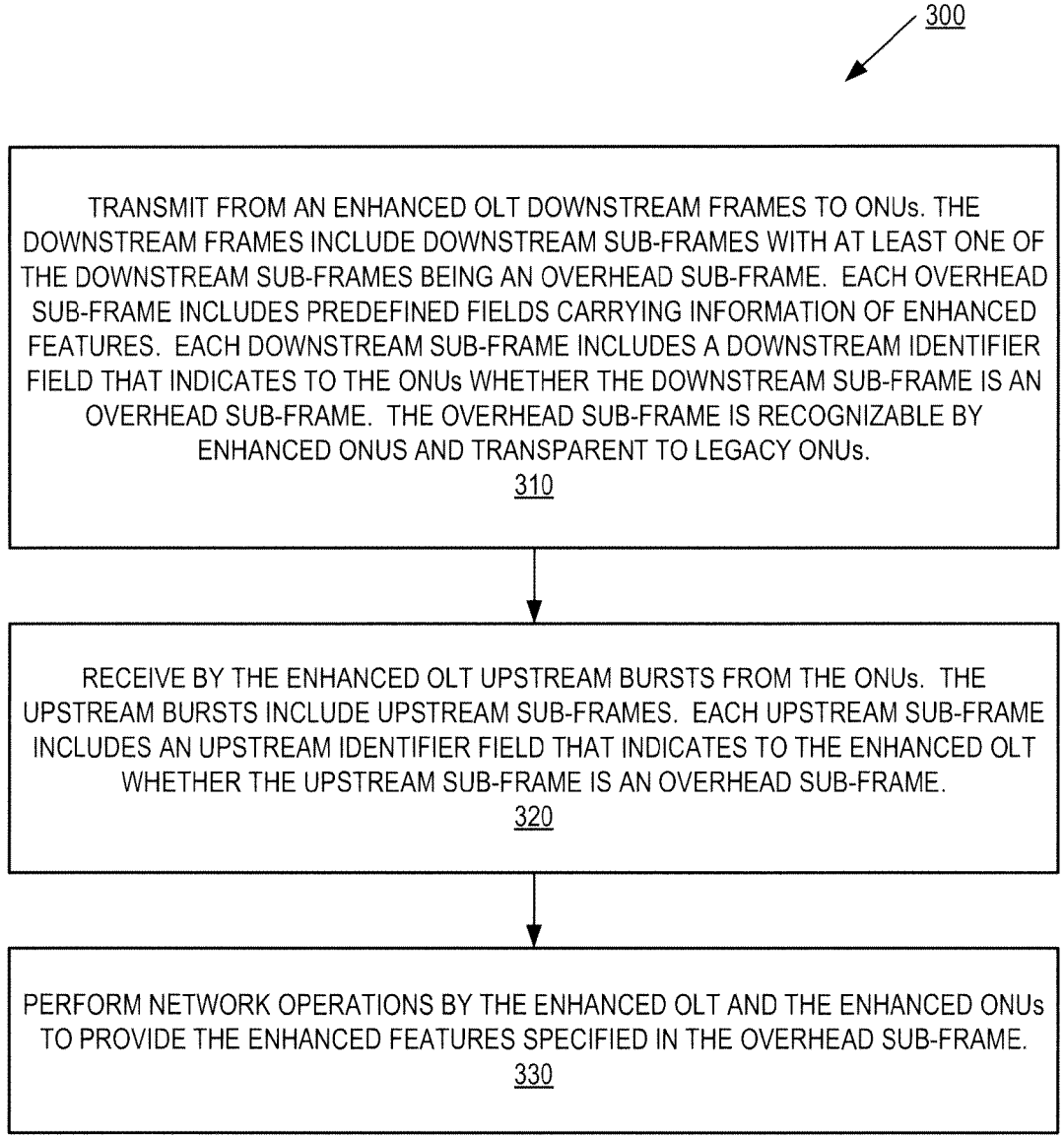
FIG. 3 is a flow diagram illustrating an embodiment of a method for providing enhanced features in a GPON.

FIG. 3 illustrates an embodiment of a method 300 for providing enhanced features in a GPON that comprises an enhanced OLT and a number of ONUs. The ONUs further include enhanced ONUs and legacy ONUs. The enhanced OLT communicates with the ONUs via downstream frames and upstream bursts, each of the downstream frames and upstream bursts being compliant with the GPON framing format. In one embodiment, the method 300 is performed by an enhanced OLT in a GPON, such as the enhanced OLT 110 in the GPON 100 of FIG. 1.

In one embodiment, an enhanced OLT transmits downstream frames to the ONUs (block 310). The downstream frames include downstream sub-frames with at least one of the downstream sub-frames being an overhead sub-frame. Each overhead sub-frame includes information of enhanced features. Each downstream sub-frame includes a downstream identifier field that indicates to the ONUs whether the downstream sub-frame is the overhead sub-frame, wherein the overhead sub-frame is recognizable by enhanced ONUs and transparent to (that is, ignored by) legacy ONUs. The enhanced OLT also receives upstream bursts from the ONUs (block 320). The upstream bursts include upstream sub-frames. Each upstream sub-frame includes an upstream identifier field that indicates to the enhanced OLT whether the upstream sub-frame is an overhead sub-frame. According to the information in the overhead sub-frames (in both upstream and downstream), the enhanced OLT and the enhanced ONUs perform network operations to provide the enhanced features (block 330).

Figure 4A:
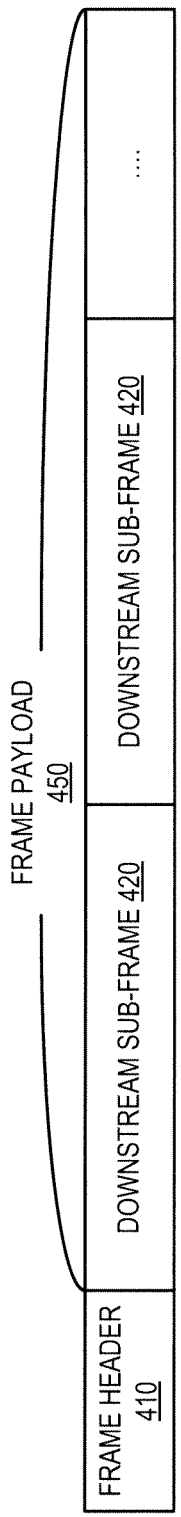
FIGS. 4A-4D are diagrams illustrating an example of a framing format for a downstream frame.
Figure 4B:
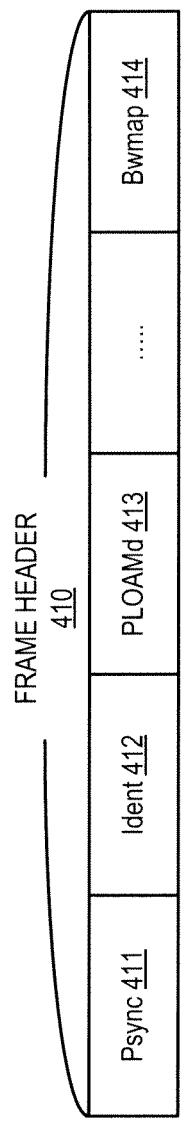
Figure 4C:
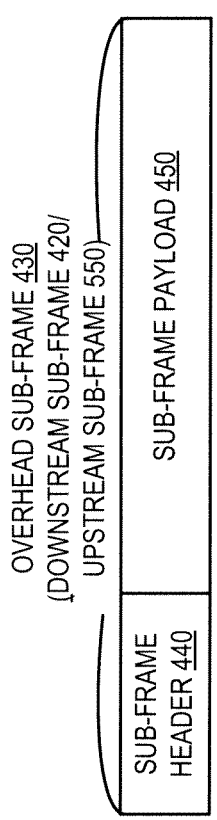

FIGS. 4A-4D illustrate an embodiment of a downstream frame 400. In this embodiment, the downstream frame 400 includes a frame header 410 and a frame payload 450. The frame payload 450 includes a number of downstream sub-frames 420. In an embodiment where the frame payload 450 is a GPON Transmission Convergence (GTC) frame, each downstream sub-frame 420 is a GEM frame. The frame header 410, as shown in FIG. 4B, includes a number of fields. The fields may include but are not limited to: a physical synchronization (Psync) field 411, an identification (Ident) field 412, a PLOAM downstream (PLOAMd) field 413, and a bandwidth map (BWmap) field 414. The definitions and the functions of the fields 411-414 are described in G.984.3. Each downstream sub-frame 420 includes a sub-frame header 440 and a sub-frame payload 450, as shown in FIG. 4C. In an embodiment where enhanced features are supported, one or more of the downstream sub-frames 420 in the downstream frame 400 can be used as an overhead sub-frame 430 (e.g., an overhead GEM frame).

Figure 4D:
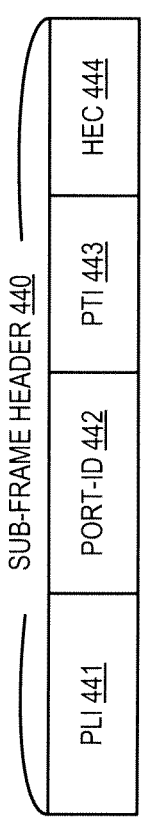

FIG. 4D shows an example of the fields in the sub-frame header 440. In one embodiment, the fields in the sub-frame header 440 include a payload length indicator (PLI) field 441, a port-ID field 442, a payload type indicator (PTI) field 443 and a header error control (HEC) field 444. In one embodiment, the port-ID field 442 is a 12-bit value that is used to provide 4096 unique traffic identifiers. In a legacy GPON, each of the 4096 unique traffic identifiers identifies a user or management transport flow. In a GPON that supports enhanced features (e.g., the GPON 100 of FIG. 1), one or more of the 4096 values can be used to identify the downstream sub-frame (in which the port-ID resides) as the overhead sub-frame 430. If the value of the port-ID field 442 identifies the overhead sub-frame 430, the content of the associated sub-frame payload 450 can be used to invoke and control the enhanced features that are supported by the GPON.

In one embodiment, the overhead sub-frame 430 can begin with a header that contains an enhanced features version number. Additional information can also be included. This leading field is designed to avoid aliasing with likely GEM frames, which include but are not limited to: Ethernet frames, OMCI messages, Multiprotocol Label Switching (MPLS) frames, and idle GEM frames (null payload or payload of patterns such as sequences of 0, 0xFF, 0xAA, 0x55).

In one embodiment, the overhead sub-frame 430 includes a number of predefined fields, with each field having a fixed length and being assigned to particular bit/byte positions to convey particular information. In an alternative embodiment, the overhead sub-frame 430 may include zero or more TLV (Type, Length and Value) strings. An example of a TLV string begins with a fixed number of octets (e.g., one octet) that specifies the type (T) of the string. The next fixed number of octets (e.g., one or two) specifies the length (L) of the string. The final sequence of octets is the value (V) of the variable to be conveyed. The value (V) part of the sequence comprises as many octets as are needed to represent the value, and may be fixed or variable from one instance to another. Because the L value allows a decoder to find the end of the TLV string, another TLV string can be added on, ad infinitum.

The fixed-field representation, the TLV representation, or other fixed-field or non-fixed-field representations may be used depending on the information to be conveyed. In some embodiment, a combination of some or all of the above may be desirable, For example, fixed fields may be optimal for information that changes often and is always needed; after the fixed part of the overhead frame, a series of non-fixed-field representations (e.g., TLV representations) could be added to designate information that needs to be conveyed only occasionally.

Figure 5B:
Figure 5B:
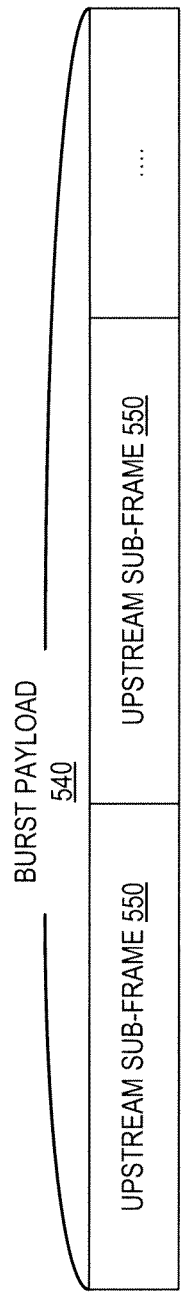

FIGS. 5A and 5B illustrate an embodiment of an upstream burst 500. Referring to FIG. 5A, the upstream burst 500 may include, but is not limited to, a physical layer overhead upstream (PLOu) field 510, a PLOAM upstream (PLOAMu) field 520, and one or more alternating fields of a dynamic bandwidth report upstream (DBRu) field 530 and a burst payload 540. It is understood that the upstream burst 500 can include more or fewer fields than the embodiment of FIG. 5A. The definitions and the functions of the fields 510, 520 and 530 are described in G.984.3. Referring to FIG. 5B, the burst payload 540 includes a number of upstream sub-frames 550. Each of the upstream sub-frames 550 has the same structure as the sub-frame shown in FIGS. 4C and 4D. In an embodiment where enhanced features are supported, one or more of the upstream sub-frames 550 in the upstream burst 500 can be an overhead sub-frame (which is the same as the overhead sub-frame 430 of FIG. 4C).

For backward compatibility, the basic GPON framing format is used unaltered, i.e. the fields described above in the downstream and the upstream directions. However, by encapsulating additional overhead into a GEM frame (e.g., the overhead sub-frame 430 of FIG. 4C), information of supported enhanced features can be conveyed to an enhanced ONU/OLT, but ignored or discarded by a legacy ONU/OLT. In one embodiment, the overhead sub-frame can be transmitted in a pre-determined position in each downstream frame/upstream burst to facilitate the control of time sensitive information. The overhead sub-frame can also be transmitted at any time, multiple times, or not at all, during a frame/burst, as convenient for the information to be conveyed.

In some embodiments, the enhanced features supported by the enhanced OLT and enhanced ONUs can include XG-PON features, as well as additional features that are not present in XG-PON. The following description provides a number of examples of the enhanced features that can be supported.

In a legacy GPON, a single PLOAM message is sent downstream in each and every downstream frame, and most PLOAM messages are transmitted three times (3×) to ensure correctness. In one embodiment, the enhanced features allow for a PLOAM message to be sent downstream zero times per downstream frame (at the minimum) and one PLOAM message per ONU plus one broadcast (at the maximum). The enhanced features also allow for the PLOAM message to be sent only once (no triple transmissions) by transmitting a transaction ID associated with the message. The ability to send PLOAM messages only once without the 3× repetition, and to send several PLOAM messages in a single frame (to separate ONUs) is significant in reducing the time required to initialize an entire GPON, especially when the GPON hosts a large number of ONUs. Legacy PLOAM messages continue to be used for the legacy devices; the enhanced PLOAM messages can be used by the enhanced devices (enhanced OLTs and enhanced ONUs). In one embodiment, the enhanced PLOAM messages can be conveyed in an overhead sub-frame (e.g., the overhead sub-frame 430 of FIG. 4C).

In one embodiment, the enhanced features allow for more bits to be used for additional GEM ports. For example, XG-PON has a 16-bit field for GEM ports, of which the first 1024 values are reserved for Optical Network Unit Management and Control Interface (OMCI). The GPON GEM port is 12 bits. In one embodiment, through overhead negotiation between enhanced OLT and enhanced ONU, some of the bits from the PTI field of the legacy GEM frame header can be cannibalized to extend the GEM port field.

In one embodiment, the enhanced features include security features such as encryption in the upstream and downstream. In a legacy GPON, unicast encryption is available in the downstream direction; the upstream direction is regarded as secure by virtue of its physical properties. The enhanced features allow for management and control of encryption in the upstream direction as well as the downstream direction.

In one embodiment, the enhanced features also include security features such as multicast encryption. A legacy GPON expects multicast to be encrypted by middleware, which some service providers deem to be insufficient. The enhanced features allow for another layer of encryption on the PON itself.

In one embodiment, the enhanced features also include security features such as key update. In multicast encryption, the key is generated by the OLT and distributed to the ONUs via OMCI, the high-layer management protocol mentioned earlier. For legacy reasons, unicast keys are generated by ONUs, and their update and use are negotiated via a cumbersome mechanism. In one embodiment, an enhanced OLT can generate keys and distribute them downstream to ONUs via the overhead sub-frames. This is an example of an enhanced feature that is not included in G.987.3 XG-PON. Some level of security (e.g., Diffie-Hellman) can be established for secure key exchange.

In one embodiment, the enhanced features also include security features such as IEEE 802.1X authentication of the ONU. In one embodiment, an enhanced OLT can treat an ONU as an untrusted device that requires 802.1X authentication by the OLT as authentication server. In some scenarios, the OLT may itself need to be authenticated before the ONU is willing to accept it. The message exchanges that form the 802.1X transaction may be encapsulated in the overhead sub-frame.

In one embodiment, the enhanced features also include security features such as a robust scrambler. In a legacy UPON, the scrambler repeats after 127 bits, which makes it conceivable that a malicious user could transfer payload that scrambles into long sequences of identical digits and thereby loses sync on the GPON. A more robust scrambler can be implemented by providing longer framing patterns than the framing patterns defined in a legacy GPON. For example, the superframe counter and scrambler in the XG-PON are long enough to render this attack effectively impossible. By extending the legacy superframe counter into an additional field of the overhead sub-frame, XG-PON scrambling can be used, effectively preventing one form of Denial of Service (DoS) attack. In any event, downstream scrambling remains legacy-based unless all ONUs on the GPON are enhanced ONUs.

In one embodiment, the enhanced features also include energy conservation features such as sleep and doze modes. This enhanced feature can be the same feature provided by the XG-PON, which has defined interlocking state machines with OMCI setup and PLOAM as well as bit-oriented signaling to coordinate sleep and doze modes between the OLT and ONU.

In one embodiment, the enhanced features also include features such as performance monitoring (PM) and alarms. This enhanced feature can be the same feature provided by the XG-PON, which has much improved PLOAM layer PM and alarms.

In the following, the discovery process of enhanced features in a GPON is described. In some embodiments, two options are possible for the discovery of enhanced features.

A first option is to carry the enhanced features in a well-known GEM port (which is identified by a well-known, i.e., standardized, GEM port ID); e.g., 0xFFE. A well-known GEM port ID has a designated value known to the enhanced OLT and the enhanced ONUs. If an enhanced ONU does not observe the enhanced features GEM port identifier in the downstream direction, it will not transmit enhanced features upstream.

Assuming a GPON having an enhanced OLT, the enhanced OLT can simply grant a payload opportunity to any traffic-bearing entity (identified by an alloc-ID) of the candidate ONU (at initialization time, this would be the default alloc-ID). In one embodiment, an enhanced ONU transmits an overhead sub-frame immediately after the burst overhead, recognizable by its well-known GEM port ID. In some embodiments, the overhead sub-frame can also be recognizable by its position immediately after the burst header, and/or by its first few bytes of content as a recognizable enhanced features version identifier. In contrast, a legacy ONU transmits GEM frames suited for the allocation, carrying OMCI, subscriber payload or no payload.

An enhanced OLT never assigns the well-known GEM port for bearer traffic. An enhanced ONU, served by a legacy OLT, accepts the well-known GEM port ID for ordinary use, as just another value with no special significance.

A second option for the discovery of enhanced features is to carry the enhanced features in a provisioned GEM port.

In one embodiment, an enhanced OLT can provision a GEM port through management actions (e.g., through an extension to a PLOAM message) when an enhanced ONU is initialized into the GPON. For example, a GEM port ID can be provisioned to an ONU via a new code point in the existing GPON PLOAM message (such as configure_port-ID). A legacy ONU may discard the PLOAM message on grounds that the code point is illegal, or may accept the code point (by not checking its validity) for use by OMCI or other purposes. (Legacy ONUs cannot send a NACK message or other error indications). In a subsequent bandwidth grant, the enhanced OLT can determine whether the specified GEM port appears as the first GEM frame in a spontaneous upstream flow (i.e., independent of alloc-ID), and if so, whether it contains an enhanced feature version number identifier. If the OLT concludes that the ONU supports only legacy features, the OLT will then de-assign the GEM port to be sure that the ONU is not using it for anything.

The content of the overhead GEM frame can include any of the enhanced features described above. For example, in the downstream direction:
  19 additional bits of superframe counter, usable for more robust scrambling and strong encryption as defined in G.987.
  Direct signaling of forced wakeup (FWI) as one of the control capabilities of enhanced sleep mode.
  Multiple PLOAM messages per frame. Only legacy PLOAM messages may be conveyed in the legacy frame/burst structures. The enhanced overhead GEM frame conveys XG PLOAM messages, and can also carry GPON PLOAM messages. Placing GPON PLOAM inside the overhead sub-frame is a way to maintain legacy rules in the GPON frame while allowing multiple PLOAM messages per frame and avoiding triple repetition within the enhanced overhead.
  XG bandwidth map—to make the GPON bandwidth map more flexible, thereby permitting broader choices of upstream transmit time and duration for enhanced ONUs, an XG map could be included in the overhead sub-frame, with quiet space left in the corresponding GPON bandwidth map.
  At least a few bits can be reserved in the enhanced BWmap for additional functions.
  An error detection/correction field that can span part or all of the legacy header as well as the overhead sub-frame header.

In one embodiment, the downstream overhead GEM frame can be of variable length, but to maintain coordination with enhanced ONUs, it would never be null. After a timeout, the disappearance of the downstream overhead would tell an enhanced ONU that the OLT was a legacy device.

In additional to the version and anti-alias header, the upstream direction overhead can include:
  A bit to indicate that the ONU has PLOAM messages queued to send even after accounting for the current transmission (either legacy or enhanced: could be separate bits).
  Direct signaling of dying gasp
  Spare bits
  Zero or one upstream XG PLOAM messages.
  Dynamic bandwidth report (DBR) with byte-level granularity.
  Error detection/correction over part or all of the legacy burst header and the overhead sub-frame header.

The operations of the flow diagram of FIG. 3 have been described with reference to the exemplary embodiment of FIGS. 1, 2, 4A-4D and 5A-5B. However, it should be understood that the operations of the flow diagrams of FIG. 3 can be performed by embodiments of the invention other than those discussed with reference to FIGS. 1, 2, 4A-4D and 5A-5B, and the embodiments discussed with reference to FIGS. 1, 2, 4A-4D and 5A-5B can perform operations different than those discussed with reference to the flow diagrams. While the flow diagram of FIG. 3 shows a particular order of operations performed by certain embodiments of the invention, it should be understood that such order is exemplary (e.g., alternative embodiments may perform the operations in a different order, combine certain operations, overlap certain operations, etc.).

As described herein, embodiments of enhanced OLTs and enhanced ONUs may be implemented by specific configurations of hardware such as application specific integrated circuits (ASICs) configured to perform certain operations or having a predetermined functionality or software instructions stored in memory embodied in a non-transitory computer readable medium. For example, the embodiment shown in FIG. 2 can be implemented using code and data stored and executed on one or more electronic devices (e.g., an end station, a network element). Such electronic devices store and communicate (internally and/or with other electronic devices over a network) code and data using computer -readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for providing enhanced features in a Gigabit-capable Passive Optical Network (GPON) that comprises an enhanced Optical Line Termination (OLT) and a plurality of Optical Network Units (ONUs), the plurality of ONUs further comprising enhanced ONUs and legacy ONUs, wherein the enhanced OLT communicates with the plurality of ONUs via downstream frames and upstream bursts, each of the downstream frames and upstream bursts being compliant with GPON standards, the method comprising the steps of:

transmitting from the enhanced OLT the downstream frames to the plurality of ONUs, the downstream frames including downstream sub-frames with at least one of the downstream sub-frames being an overhead sub-frame that includes information of the enhanced features, wherein each of the downstream sub-frames includes a downstream identifier field that indicates to the plurality of ONUs whether the downstream sub-frame is the overhead sub-frame, wherein the overhead sub-frame is recognizable by the enhanced ONUs and transparent to the legacy ONUs;

receiving by the enhanced OLT the upstream bursts from the plurality of ONUs, the upstream bursts including upstream sub-frames, each of the upstream sub-frames including an upstream identifier field that indicates to the enhanced OLT whether the upstream sub-frame is the overhead sub-frame; and performing network operations by the enhanced OLT and the enhanced ONUs to provide the enhanced features specified in the overhead sub-frame.

2. The method of claim 1, wherein each of the upstream identifier field and the downstream identifier field has a designated value recognizable by the enhanced ONUs and not by the legacy ONUs, and the designated value is different from values recognizable by one or more destination ONUs of the plurality of ONUs for identifying a traffic flow to one or more destination ONUs.

3. The method of claim 2, wherein the designated value is provisioned to each of the enhanced ONUs through management actions when the enhanced ONU is initialized into the GPON.

4. The method of claim 1, wherein the overhead sub-frame contains a header that includes the downstream identifier field or the upstream identifier field, and a payload that contains the information of the enhanced features.

5. The method of claim 1, wherein the overhead sub-frame is transmitted once per downstream frame and once per upstream burst.

6. The method of claim 1, wherein at least one of the downstream frames and the upstream bursts includes more than one overhead sub-frame.

7. The method of claim 1, wherein the overhead sub-frame is a GPON encapsulation method (GEM) frame.

8. The method of claim 1, wherein the enhanced features include one or more of a set of features defined in a 10 Gigabit-capable Passive Optical Network (XG-PON).

9. The method of claim 1, wherein the enhanced features include one or more of the following: transmission of multiple PLOAM messages per downstream frame, transmission of multiple PLOAM messages per upstream burst, transmission of a PLOAM message without repetition, encryption control in both upstream and downstream directions, multicast encryption control, ONU authentication, key update, sleep and doze modes, performance monitoring and alarms, and longer framing patterns than the framing patterns defined in a legacy GPON that does not support the enhanced features.

10. The method of claim 1, wherein the step of receiving further comprises the steps of:

receiving a first set of upstream bursts from the enhanced ONUs and a second set of upstream bursts from the legacy ONUs, the first set of upstream bursts comprising one or more overhead sub-frames and the second set of upstream bursts comprising no overhead sub-frames;

processing the first set of upstream bursts to implement the enhanced features; and processing the second set of upstream bursts without implementing the enhanced features.

11. A network element functioning as an enhanced Optical Line Termination (OLT) for implementing enhanced features in a Gigabit-capable Passive Optical Network (GPON) that comprises the enhanced OLT and a plurality of Optical Network Units (ONUs), the plurality of ONUs further comprising enhanced ONUs and legacy ONUs, wherein the enhanced OLT communicates with the plurality of ONUs via downstream frames and upstream bursts, each of the downstream frames and upstream bursts being compliant with GPON standards, the network element comprising:

a transmitter to transmit the downstream frames to the plurality of ONUs, the downstream frames including downstream sub-frames with at least one of the downstream sub-frames being an overhead sub-frame that includes information of the enhanced features, wherein each of the downstream sub-frames includes a downstream identifier field that indicates to the plurality of ONUs whether the downstream sub-frame is the overhead sub-frame, wherein the overhead sub-frame is recognizable by the enhanced ONUs and transparent to the legacy ONUs;

a receiver to receive the upstream bursts from the plurality of ONUs, the upstream bursts including upstream sub-frames, each of the upstream sub-frames including an upstream identifier field that indicates to the enhanced OLT whether the upstream sub-frame is the overhead sub-frame; and a processor coupled to the transmitter and the receiver to perform network operations to thereby provide the enhanced features specified in the overhead sub-frame.

12. The network element of claim 11, wherein each of the upstream identifier field and the downstream identifier field has a designated value recognizable by the enhanced ONUs and not by the legacy ONUs, and the designated value is different from values recognizable by one or more destination ONUs of the plurality of ONUs for identifying a traffic flow to one or more destination ONUs.

13. The network element of claim 11, wherein the overhead sub-frame contains a header that includes the downstream identifier field or the upstream identifier field, and a payload that contains the information of the enhanced features.

14. The network element of claim 13, wherein the designated value is provisioned to each of the enhanced ONUs through management actions when the enhanced ONU is initialized into the GPON.

15. The network element of claim 11, wherein the overhead sub-frame is a GPON encapsulation method (GEM) frame.

16. The network element of claim 11, wherein the enhanced features include one or more of a set of features defined in a 10 Gigabit-capable Passive Optical Network (XG-PON).

17. The network element of claim 11, wherein the enhanced features include one or more of the following: transmission of multiple PLOAM messages per downstream frame, transmission of multiple PLOAM messages per upstream burst, transmission of a PLOAM message without repetition, control of encryption in both upstream and downstream directions, multicast encryption control, ONU authentication, key update, sleep and doze modes, performance monitoring and alarms, and longer framing patterns than the framing patterns defined in a legacy GPON that does not support the enhanced features.

18. A network element functioning as an enhanced Optical Network Unit (ONU) for implementing enhanced features in a Gigabit-capable Passive Optical Network (GPON) that comprises an enhanced Optical Line Termination (OLT) and a plurality of Optical Network Units (ONUs), the plurality of ONUs further comprising legacy ONUs and the enhanced ONU, wherein the enhanced OLT communicates with the plurality of ONUs via downstream frames and upstream bursts, each of the downstream frames and upstream bursts being compliant with GPON standards, the network element comprising:
 a receiver to receive the downstream frames from the enhanced OLT, the downstream frames including downstream sub-frames with at least one of the downstream sub-frames being an overhead sub-frame that includes information of the enhanced features, wherein each of the downstream sub-frames includes a downstream identifier field that indicates to the plurality of ONUs whether the downstream sub-frame is the overhead sub-frame, wherein the overhead sub-frame is recognizable by the enhanced ONUs and transparent to the legacy ONUs;
 a transmitter to transmit the upstream bursts to the enhanced OLT, the upstream bursts including upstream sub-frames, each of the upstream sub-frames including an upstream identifier field that indicates to the enhanced OLT whether the upstream sub-frame is the overhead sub-frame; and
 a processor coupled to the transmitter and the receiver to perform network operations to thereby provide the enhanced features specified in the overhead sub-frame.

19. The network element of claim 18, wherein the overhead sub-frame contains a header that includes the downstream identifier field or the upstream identifier field, and a payload that contains the information of the enhanced features.

20. The network element of claim 18, wherein the downstream identifier field or the upstream identifier field of each of the overhead sub-frame has a designated value known to the enhanced OLT and the enhanced ONU.

21. The network element of claim 20, wherein the designated value is provisioned to the enhanced ONU through management actions when the enhanced ONU is initialized into the GPON.

22. The network element of claim 18, wherein the overhead sub-frame is a GPON encapsulation method (GEM) frame.

* * * * *

UNITED STATES PATENT AND TRADEMARK OFFICE
CERTIFICATE OF CORRECTION

PATENT NO.       : 8,548,328 B2                           Page 1 of 1
APPLICATION NO.  : 13/236360
DATED            : October 1, 2013
INVENTOR(S)      : Hood It is certified that error appears in the above-identified patent and that said Letters Patent is hereby corrected as shown below:

In the Specification

In Column 2, Line 42, delete "UPON" and insert -- GPON --, therefor.

In Column 3, Line 39, delete "overhead structure," and insert -- overhead structure. --, therefor.

In Column 4, Line 49, delete "UPON 100" and insert -- GPON 100 --, therefor.

In Column 6, Line 65, delete "desirable," and insert -- desirable. --, therefor.

In Column 8, Line 37, delete "UPON," and insert -- GPON, --, therefor.

Signed and Sealed this
Fifteenth Day of April, 2014

Michelle K. Lee
*Deputy Director of the United States Patent and Trademark Office*